US 12,265,167 B2

United States Patent
Xing et al.

(10) Patent No.: US 12,265,167 B2
(45) Date of Patent: Apr. 1, 2025

(54) WIRELESS RECEIVE SIGNAL STRENGTH INDICATOR (RSSI)-BASED POSITIONING

(71) Applicant: Samsung Electronics Co., Ltd., Suwon-si (KR)

(72) Inventors: Tianwei Xing, Santa Clara, CA (US); Wenjun Jiang, San Jose, CA (US); Xun Chen, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 17/930,644

(22) Filed: Sep. 8, 2022

(65) Prior Publication Data

US 2023/0417862 A1    Dec. 28, 2023

Related U.S. Application Data

(60) Provisional application No. 63/355,964, filed on Jun. 27, 2022.

(51) Int. Cl.
  *G01S 5/02*    (2010.01)
  *H04W 64/00*    (2009.01)

(52) U.S. Cl.
  CPC ....... *G01S 5/02521* (2020.05); *H04W 64/003* (2013.01)

(58) Field of Classification Search
  CPC .................. G01S 5/02521; H04W 64/003
  (Continued)

(56) References Cited

U.S. PATENT DOCUMENTS

| | | | |
|---|---|---|---|
| 6,263,208 B1 * | 7/2001 | Chang | H04W 64/00 342/357.31 |
| 8,890,685 B1 * | 11/2014 | Sookman | H04W 4/90 340/539.13 |

(Continued)

FOREIGN PATENT DOCUMENTS

| | | |
|---|---|---|
| CN | 104066178 A | 9/2014 |
| CN | 113747355 A | 12/2021 |

(Continued)

OTHER PUBLICATIONS

Njima et al., "Indoor Localization Using Data Augmentation via Selective Generative Adversarial Networks", IEEE Access, vol. 9, 2021, 11 pages.

(Continued)

*Primary Examiner* — Don N Vo

(57) ABSTRACT

A method includes receiving wireless fingerprint data identifying multiple locations within a specified area and, for each location, one or more signal strength values associated with wireless signals received from one or more of multiple wireless transmitters. The wireless fingerprint data is missing signal strength values for one or more transmitters at one or more specific locations. The method also includes generating a training dataset by adding filler signal strength values in place of at least some missing values. The method further includes training a machine learning model using the training dataset. The model is trained to receive a specified location as input and generate predicted signal strength values as outputs. In addition, the method includes using the trained model to generate additional signal strength values. At least some additional signal strength values are to be used in place of at least a portion of the missing values.

26 Claims, 5 Drawing Sheets

(58) Field of Classification Search
USPC .................................................... 455/456.1
See application file for complete search history.

(56) References Cited

U.S. PATENT DOCUMENTS

| | | | |
|---|---|---|---|
| 10,716,089 B1 | 7/2020 | Huberman et al. | |
| 10,733,515 B1 | 8/2020 | Mishra et al. | |
| 11,307,286 B1 | 4/2022 | Wang et al. | |
| 2013/0005348 A1* | 1/2013 | Sanders | G01S 5/12 455/456.1 |
| 2014/0058778 A1* | 2/2014 | Mclarty | H04B 7/0857 705/7.19 |
| 2017/0067982 A1 | 3/2017 | Pan et al. | |
| 2019/0041488 A1 | 2/2019 | Ivanov et al. | |
| 2019/0150006 A1* | 5/2019 | Yang | G06N 3/08 455/422.1 |
| 2020/0067914 A1 | 2/2020 | Glozman et al. | |
| 2020/0404448 A1* | 12/2020 | Park | G06Q 20/40155 |
| 2021/0250891 A1 | 8/2021 | Murata et al. | |
| 2021/0281976 A1 | 9/2021 | Saha et al. | |
| 2022/0196786 A1 | 6/2022 | Eizenberg | |

FOREIGN PATENT DOCUMENTS

| | | |
|---|---|---|
| CN | 114449452 A | 5/2022 |
| KR | 102145717 B1 | 8/2020 |
| KR | 20210070431 A | 6/2021 |
| KR | 102278699 B1 | 7/2021 |

OTHER PUBLICATIONS

Dong et al., "Dealing with Insufficient Location Fingerprints in Wi-Fi Based Indoor Location Fingerprinting," Wireless Communications and Mobile Computing, vol. 2017, 12 pages.
International Search Report and Written Opinion of the International Searching Authority dated Sep. 22, 2023 in connection with International Patent Application No. PCT/KR2023/008440, 9 pages.

* cited by examiner

WIRELESS RECEIVE SIGNAL STRENGTH INDICATOR (RSSI)-BASED POSITIONING

CROSS-REFERENCE TO RELATED APPLICATION AND PRIORITY CLAIM

This application claims priority under 35 U.S.C. § 119(e) to U.S. Provisional Patent Application No. 63/355,964 filed on Jun. 27, 2022. This provisional application is hereby incorporated by reference in its entirety.

TECHNICAL FIELD

This disclosure relates generally to positioning systems. More specifically, this disclosure relates to wireless receive signal strength indicator (RSSI)-based positioning.

BACKGROUND

Mobile electronic devices have become ubiquitous in today's society, and location-based services are routinely supported by many mobile electronic devices. Location-based services typically require accurate location information of the mobile electronic devices in order to ensure that correct information is provided to users of the mobile electronic devices based on their current locations. However, obtaining accurate location information for mobile electronic devices can be challenging in certain environments. For example, in indoor environments, Global Positioning System (GPS) or other Global Navigation Satellite System (GNSS) signals often cannot penetrate building walls or ceilings. As a result, the positions of mobile electronic devices estimated using GPS/GNSS signals may be relatively inaccurate, often having an accuracy on the order of tens of meters. This accuracy can be insufficient in many scenarios.

SUMMARY

This disclosure relates to wireless receive signal strength indicator (RSSI)-based positioning.

In a first embodiment, a method includes receiving wireless fingerprint data associated with a specified area. The wireless fingerprint data identifies (i) multiple locations within the specified area and (ii) for each location, one or more signal strength values associated with wireless signals received at the location from one or more of multiple wireless transmitters. The wireless fingerprint data is missing signal strength values for one or more of the wireless transmitters at one or more specific locations within the specified area. The method also includes generating a first training dataset by adding filler signal strength values in place of at least some of the signal strength values that are missing from the wireless fingerprint data. The method further includes training a first machine learning model using the first training dataset. The first machine learning model is trained to receive a specified location as input and generate predicted signal strength values as outputs. In addition, the method includes using the trained first machine learning model to generate additional signal strength values. At least some of the additional signal strength values are to be used in place of at least a portion of the signal strength values that are missing from the wireless fingerprint data.

In a second embodiment, an apparatus includes at least one processing device configured to receive wireless fingerprint data associated with a specified area. The wireless fingerprint data identifies (i) multiple locations within the specified area and (ii) for each location, one or more signal strength values associated with wireless signals received at the location from one or more of multiple wireless transmitters. The wireless fingerprint data is missing signal strength values for one or more of the wireless transmitters at one or more specific locations within the specified area. The at least one processing device is also configured to generate a first training dataset by adding filler signal strength values in place of at least some of the signal strength values that are missing from the wireless fingerprint data. The at least one processing device is further configured to train a first machine learning model using the first training dataset. The first machine learning model is trained to receive a specified location as input and generate predicted signal strength values as outputs. In addition, the at least one processing device is configured to use the trained first machine learning model to generate additional signal strength values. At least some of the additional signal strength values are to be used in place of at least a portion of the signal strength values that are missing from the wireless fingerprint data.

In a third embodiment, a non-transitory computer readable medium contains instructions that when executed cause at least one processor to receive wireless fingerprint data associated with a specified area. The wireless fingerprint data identifies (i) multiple locations within the specified area and (ii) for each location, one or more signal strength values associated with wireless signals received at the location from one or more of multiple wireless transmitters. The wireless fingerprint data is missing signal strength values for one or more of the wireless transmitters at one or more specific locations within the specified area. The medium also contains instructions that when executed cause the at least one processor to generate a first training dataset by adding filler signal strength values in place of at least some of the signal strength values that are missing from the wireless fingerprint data. The medium further contains instructions that when executed cause the at least one processor to train a first machine learning model using the first training dataset. The first machine learning model is trained to receive a specified location as input and generate predicted signal strength values as outputs. In addition, the medium contains instructions that when executed cause the at least one processor to use the trained first machine learning model to generate additional signal strength values. At least some of the additional signal strength values are to be used in place of at least a portion of the signal strength values that are missing from the wireless fingerprint data.

In a fourth embodiment, a method includes obtaining, by a mobile electronic device, signal strength values associated with wireless signals received at the mobile electronic device. The method also includes providing the obtained signal strength values as input to a trained location prediction machine learning model. The method further includes using the trained location prediction machine learning model to generate a predicted location of the mobile electronic device. In addition, the method includes presenting the predicted location of the mobile electronic device on a display of the mobile electronic device. The trained location prediction machine learning model is trained using (i) wireless fingerprint data collected within a specified area and (ii) imputed or augmented signal strength values generated using a trained generator machine learning model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
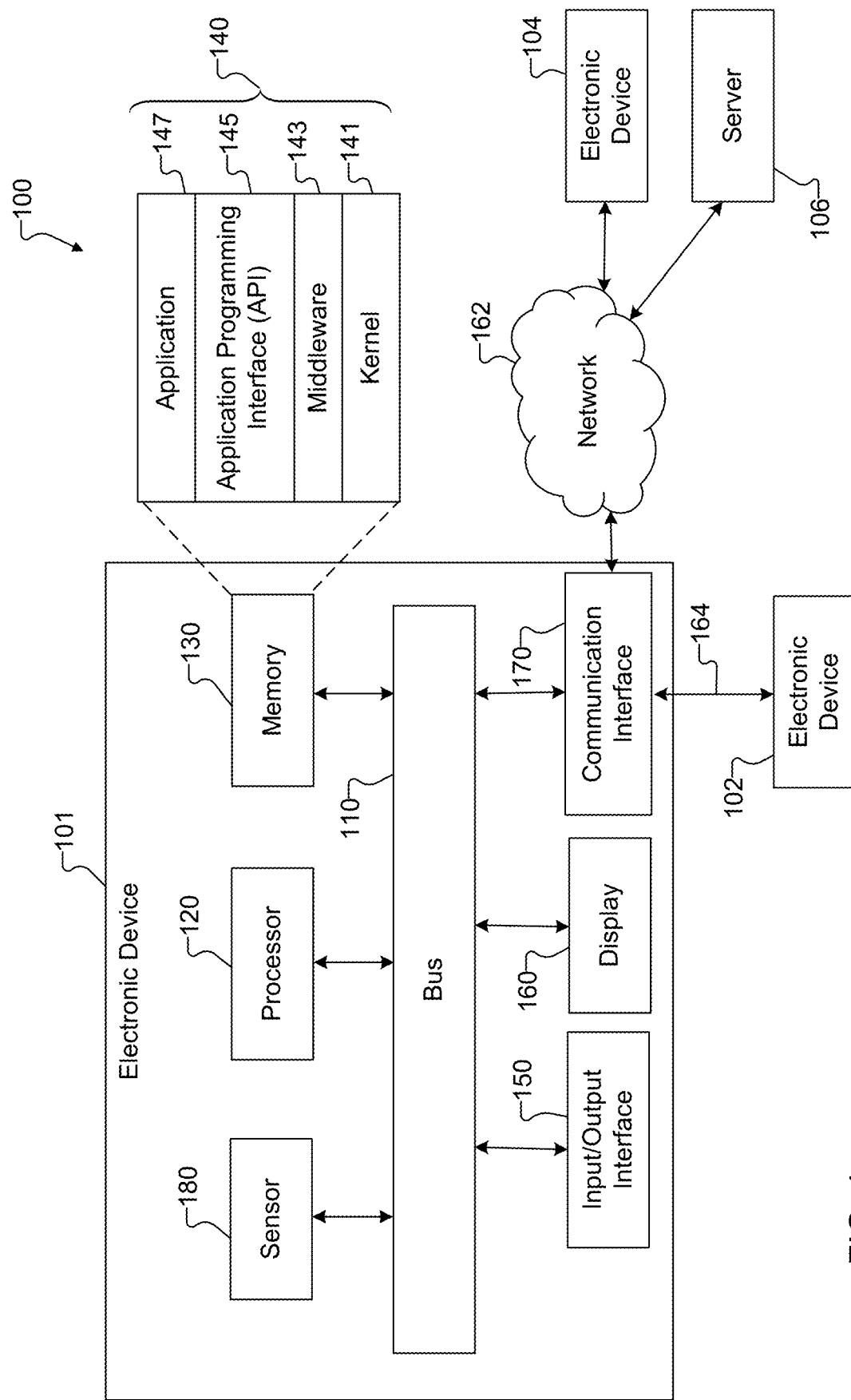
FIG. 1 illustrates an example network configuration including an electronic device in accordance with this disclosure.

FIGS. 1 through 6, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, mobile electronic devices have become ubiquitous in today's society, and location-based services are routinely supported by many mobile electronic devices. Location-based services typically require accurate location information of the mobile electronic devices in order to ensure that correct information is provided to users of the mobile electronic devices based on their current locations. However, obtaining accurate location information for mobile electronic devices can be challenging in certain environments. For example, in indoor environments, Global Positioning System (GPS) or other Global Navigation Satellite System (GNSS) signals often cannot penetrate building walls or ceilings. As a result, the positions of mobile electronic devices estimated using GPS/GNSS signals may be relatively inaccurate, often having an accuracy on the order of tens of meters. This accuracy can be insufficient in many scenarios.

Ultra-wideband (UWB) technology has emerged in recent years as a robust solution for mobile device positioning. UWB technology is a wireless positioning technology that supports a high transmission rate, a low transmit power, and a strong penetration capability. UWB technology typically employs multi-sensor techniques that use time-difference-of-arrival (TDOA) and angle-of-arrival (AOA) calculations to analyze received wireless signals and identify locations of mobile electronic devices with relatively-high accuracy (such as centimeter-level accuracy). However, many mobile devices do not support the use of UWB technology. Moreover, high deployment costs can make UWB-based positioning systems impractical in many applications.

Other approaches may attempt to use receive signal strength indicator (RSSI) values for Wi-Fi signals or other wireless signals in a specified area in order to generate RSSI-based "fingerprints," which can be used to estimate the locations of mobile devices based on the RSSI values measured at the mobile devices. Many mobile devices support the calculation of RSSI values for received wireless signals, and these approaches could provide a low-cost solution to the indoor positioning problem. However, reliable indoor positioning based on the usage of RSSI-based fingerprints is difficult. Typically, these approaches require that smart mobile devices be used to collect wireless RSSI fingerprint data by traversing through a target area multiple times, where both RSSI values and actual locations (such as the collectors' trajectories) are recorded. A machine learning model may then be trained using the collected fingerprint data, and the trained machine learning model can be deployed for use during inferencing in order to identify locations of end users' mobile devices. While this approach is low-cost and easy to implement from the perspective of the end users, this approach requires a very laborious fingerprinting process and can still suffer from poor positioning accuracy. One of the main reasons for the poor positioning accuracy is the instability of the RSSI values. Even at the same physical position in space, RSSI values can fluctuate with time and direction due to factors such as shadowing and fading effects. Also, RSSI values for some wireless access points or other wireless transmitters may be randomly missing or unavailable at different times, such as during data collection or inferencing.

This disclosure provides for improved wireless RSSI-based positioning. As described in more detail below, RSSI values for a specified area can be collected, where those RSSI values represent RSSI-based fingerprints at different locations within the specified area. Each RSSI-based fingerprint may generally include a collection of two or more RSSI measurements associated with two or more Wi-Fi access points or other sources of wireless signals. The collected RSSI-based fingerprints will typically be missing a number of data points, such as RSSI values at various locations within the specified area. As a particular example, the RSSI-based fingerprints for locations within the specified area may lack RSSI values for one or more specific sources of wireless signals. According to this disclosure, filler data is generated for the missing or incomplete RSSI-based data, such as by averaging or otherwise using known RSSI values in a local neighborhood of discrete positions within the specified area where RSSI values are missing or incomplete. This helps to form a more complete set of RSSI-based fingerprints for the specified area.

A machine learning-based RSSI generator can be trained using the more complete set of RSSI-based fingerprints, where the RSSI generator is trained to estimate the RSSI values that are expected to be seen at locations within the specified area. In other words, the RSSI generator is trained to perform the "inverse" of RSSI-based location prediction, which means that the RSSI generator is trained to estimate RSSI fingerprints at locations within the specified area (rather than identifying a location within the specified area based on an RSSI fingerprint). Among other things, the RSSI generator can be used to perform data imputation or data augmentation in order to generate RSSI fingerprint data for desired locations within the specified area. For instance, the RSSI generator may be used to generate RSSI fingerprints for locations in the specified area that had incomplete or missing RSSI values in the original RSSI values. This can be particularly useful in situations where the original RSSI values were sparse.

Imputed/augmented RSSI fingerprints from the RSSI generator can be used (along with the RSSI fingerprints in the original RSSI values) to train a location prediction machine learning model. The location prediction machine learning model may represent a deep neural network or other machine learning model that is trained to predict the location of an electronic device based on an RSSI fingerprint captured by the electronic device. Once the machine learning model is adequately trained, the trained machine learning model can be deployed to end users' mobile devices for use in identifying the locations of the end users' mobile devices in the specified area. Optional testing of the trained machine learning model may occur after training and prior to deployment in order to verify proper operation of the trained machine learning model.

In this way, the described approaches help to supplement the RSSI fingerprint data available for training machine learning models, which can significantly improve the accuracy of the resulting locations determined using the trained machine learning models. Since missing or incomplete RSSI values can be filled in using data imputation/augmentation via the RSSI generator, the imputed/augmented data can be more consistent and contain fewer or no missing or incomplete RSSI values for given locations, and the imputed/augmented data can be used to train a better location prediction machine learning model with lower positioning errors. In some cases, for instance, the average error and standard deviation of location estimates may decrease by up to about 60% or more depending on the implementation. Moreover, the described approaches allow the RSSI generator to learn complex dependencies from locations to RSSI values. Instead of limiting usage to some predefined physical path loss model, the RSSI generator can use a data-driven approach to capture not only signal attenuation effects but also spatial features in complex indoor environments such as shopping centers and supermarkets. The RSSI generator can therefore be used effectively for data imputation or augmentation in order to create abundant and realistic RSSI values with high quality for use in training the location prediction machine learning model. Further, the RSSI generator can be trained as described below to learn how to estimate realistic RSSI values given the specified area. In addition, the described approaches allow for Wi-Fi or other wireless signals to be used to perform robust indoor positioning, even in the presence of noisy wireless signals.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may be used to perform or support one or more functions related to wireless RSSI-based positioning, such as generating RSSI fingerprints, training a machine learning model, or performing location prediction using a trained machine learning model.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications related to wireless RSSI-based positioning, such as one or more applications for generating RSSI fingerprints, training a machine learning model, or performing location prediction using a trained machine learning model. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to perform or support one or more functions related to wireless RSSI-based positioning, such as generating RSSI fingerprints, training a machine learning model, or performing location prediction using a trained machine learning model.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
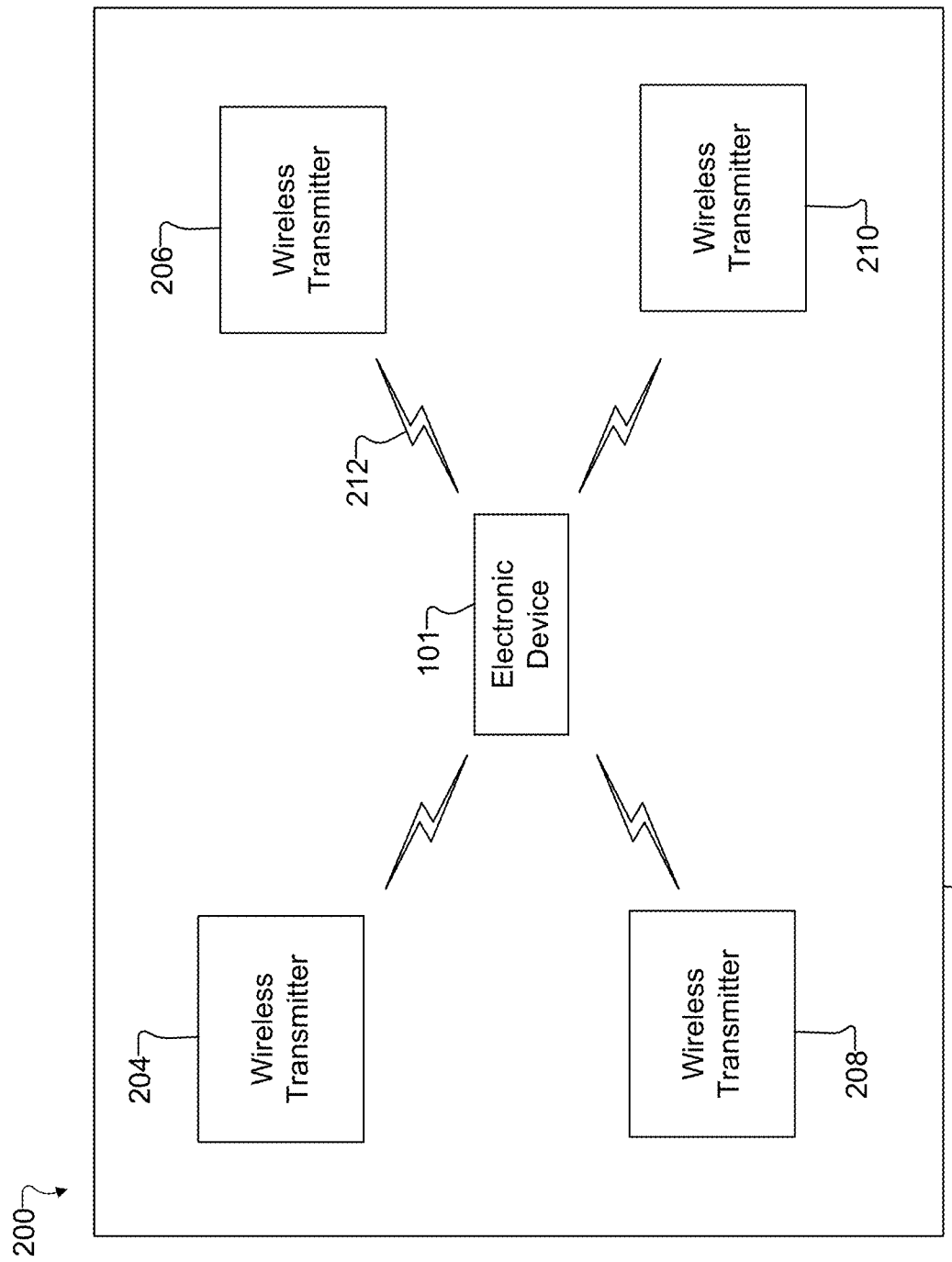
FIG. 2 illustrates an example wireless receive signal strength indicator (RSSI)-based positioning system in accordance with this disclosure.

FIG. 2 illustrates an example wireless RSSI-based positioning system 200 in accordance with this disclosure. For ease of explanation, the positioning system 200 is described as involving the use of the electronic device 101 of FIG. 1. However, the positioning system 200 may be used with any other suitable electronic device, and the electronic device 101 may be used with any other suitable positioning system.

As shown in FIG. 2, the electronic device 101 is located within a specified area 202. The specified area 202 represents any suitable space in which the electronic device 101 is able to be moved and in which the location of the electronic device 101 can be estimated using RSSI-based fingerprints. In some cases, the specified area 202 may represent a commercial space, such as a shopping center, mall, supermarket, or other business. Also, in some cases, the specified area 202 may include one or more obstructions that can interfere with the propagation of electromagnetic signals within the space. The one or more obstructions may include walls, ceilings, or other components of a building or other structure. The one or more obstructions may also or alternatively include heating/ventilation/air conditioning (HVAC) equipment, shelves with products or other items, vehicles, or other objects within, on, or around a building or other structure. Note, however, that the positioning system 200 may be used with any suitable specified area and is not limited to these particular examples.

The specified area 202 includes or is otherwise associated with multiple wireless transmitters 204-210. Each wireless transmitter 204-210 is configured at a minimum to transmit wireless signals 212 that can be received and measured by the electronic device 101. In some cases, one or more of the wireless transmitters 204-210 may be used within or in conjunction with one or more wireless receivers configured to receive wireless signals transmitted from the electronic device 101 (such as to support bidirectional communication). In these cases, each of those wireless transmitters 204-210 may be associated with or included within a wireless receiver or a wireless transceiver. Each wireless transmitter 204-210 represents any suitable source of wireless signals 212 that can be used by the electronic device 101 for location prediction. In some embodiments, the wireless transmitters 204-210 represent Wi-Fi access points or Wi-Fi repeaters, which are commonly installed in a large number of businesses and other locations. However, this disclosure is not limited to use with Wi-Fi signals.

Different RSSI fingerprints are associated with different locations within the specified area 202. For example, locations closer to the wireless transmitter 204 might typically be expected to have larger RSSI values for wireless signals 212 from the wireless transmitter 204, smaller RSSI values for wireless signals 212 from the wireless transmitters 206-208, and even smaller RSSI values for wireless signals 212 from the wireless transmitter 210. However, due to obstructions or other issues like shadowing and fading effects, there is not necessarily a linear relationship between RSSI values and distance from a wireless transmitter. Thus, the actual RSSI value for each wireless transmitter 204-210 can vary based on the location within the specified area 202. The RSSI fingerprints associated with different locations within the specified area 202 can represent average or other RSSI values that are measured by at least one electronic device at those different locations within the specified area 202. Each RSSI fingerprint might typically include two or more RSSI values that are associated with two or more of the wireless transmitters 204-210, although any individual RSSI fingerprint may include a single RSSI value associated with a single wireless transmitter or more than two RSSI values associated with more than two wireless transmitters depending on the circumstances.

As described in more detail below, RSSI values can be obtained for various locations within the specified area 202, such as by using at least one smart electronic device to measure RSSI values while the at least one smart electronic device is being moved through the specified area 202. Filler RSSI values for missing or incomplete RSSI values can be estimated and used to form a more complete set of RSSI values, and this set of RSSI values can be used as training RSSI fingerprints to train an RSSI generator. For example, the RSSI generator can be trained to estimate RSSI fingerprints at locations within the specified area 202, which allows the RSSI generator to impute or augment RSSI values in order to generate a larger number (and possibly a much larger number) of RSSI fingerprints for the specified area 202 compared to the original RSSI values that are captured. These RSSI fingerprints can be used to train a location prediction machine learning model, which can be optionally tested and deployed to end user devices (such as the electronic device 101) for use in locating the end user devices within the specified area 202. In this way, the location prediction machine learning model can be trained to perform robust indoor positioning and other positioning estimations that are more accurate compared to other RSSI-based approaches.

Although FIG. 2 illustrates one example of a wireless RSSI-based positioning system 200, various changes may be made to FIG. 2. For example, the specified area 202 may have any suitable size, shape, and dimensions. Also, the specified area 202 may include or otherwise be associated with any suitable number of wireless transmitters or other suitable sources of wireless signals.

Figure 3:
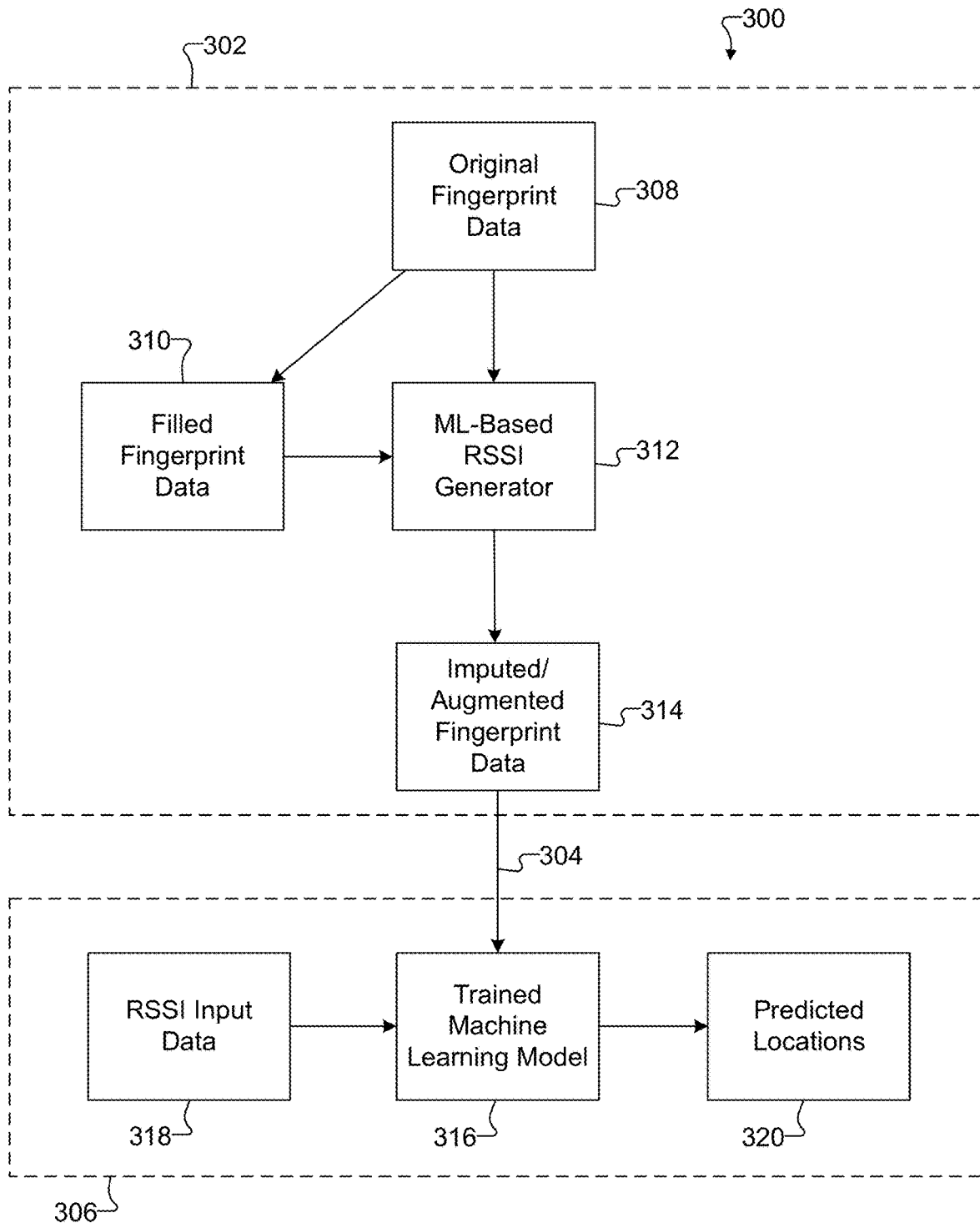
FIG. 3 illustrates an example process for wireless RSSI-based positioning in accordance with this disclosure.

FIG. 3 illustrates an example process 300 for wireless RSSI-based positioning in accordance with this disclosure. For ease of explanation, the process 300 is described as involving the use of the electronic device 101 of FIG. 1 in the positioning system 200 of FIG. 2. However, the process 300 may be used with any other suitable electronic device and any other suitable positioning system.

As shown in FIG. 3, the process 300 generally includes a data imputation/augmentation subprocess 302, a model training subprocess 304, and a location prediction/inferencing subprocess 306 (each of which may be implemented using a separate functional module or modules in some cases). The data imputation/augmentation subprocess 302 generally operates to process original fingerprint data 308, which represents RSSI values captured within a specified area 202. The original fingerprint data 308 can include RSSI fingerprints captured at various locations within the specified area 202, such as by using one or more smart electronic devices that are moved around the specified area 202. The original fingerprint data 308 may often associate measured RSSI values with known locations within the specified area 202, such as when the RSSI values are associated with specific coordinates or trajectories of the smart electronic devices within the specified area 202. As a particular example, a user may repeatedly identify his or her location on a map of the specified area 202 using a smart electronic device and use the smart electronic device to capture RSSI measurements at that location.

The original fingerprint data 308 may include any suitable number of RSSI fingerprints for any suitable number of locations within the specified area 202. However, the original fingerprint data 308 may be missing various RSSI values or have incomplete RSSI values, such as when the original fingerprint data 308 lacks RSSI values for specific wireless transmitters at different locations within the specified area 202 or when the original fingerprint data 308 lacks any RSSI values for certain locations within the specified area 202. In some cases, a relatively large number of RSSI values may be missing or incomplete in the original fingerprint data 308 (possibly even a majority of the possible RSSI values may be missing), so the original fingerprint data 308 can be processed as described below to supplement or fill in the missing or incomplete information. In some embodiments, preprocessing of the original fingerprint data 308 may occur prior to additional processing, such as to remove invalid or abnormal RSSI values from the original fingerprint data 308. Also, in some embodiments, each RSSI fingerprint that is contained in the original fingerprint data 308 or in the preprocessed version of the original fingerprint data 308 may be expressed using a tuple [$RSSI^i$, $Coord^i$]. Here, $RSSI^i$=[$rssi_1$, $rssi_2$, . . . , $rssi_M$] represents a vector of measured RSSI values associated with wireless signals received from M wireless transmitters for the $i^{th}$ RSSI fingerprint, and $Coord^i$ represents the coordinates of the location at which the RSSI values were measured for the $i^{th}$ RSSI fingerprint.

The original fingerprint data 308 or the preprocessed version of the original fingerprint data 308 can be processed in order to fill in the missing or incomplete RSSI values and produce filled fingerprint data 310. The filled fingerprint data 310 includes RSSI values that were not contained in the original fingerprint data 308. In some cases, the filled fingerprint data 310 may include numerous RSSI values that were not contained in the original fingerprint data 308. As a result, the filled fingerprint data 310 represents a more complete set of RSSI fingerprints for the specified area 202.

Filler RSSI values for the missing or incomplete RSSI values may be generated for inclusion in the filled fingerprint data 310 in any suitable manner. In some embodiments, for example, when an RSSI value is unavailable for one of M wireless transmitters at a given location in the specified area 202, the RSSI value for that wireless transmitter may be filled in using an average of RSSI values for the same wireless transmitter in a local neighborhood around that given location. For instance, assume an RSSI value $rssi_M^i$ represents the RSSI value for the $M^{th}$ wireless transmitter in the $i^{th}$ RSSI fingerprint and is missing for a given location in the specified area 202. In that case, other RSSI values $rssi_M$ for the same wireless transmitter measured within a specified range of the given location can be averaged in order to generate the RSSI value $rssi_M^i$ at the given location. In some embodiments, this can be expressed mathematically as follows. If an RSSI value $rssi_M^i$ is missing for a given location, other datapoints $j \in N$ can be identified as being within a specified distance range when $|Coord^j - Coord^i|^2 <$ threshold for all j in the set N. This means that another datapoint can be selected when the squared distance between its coordinates and the coordinates of the missing RSSI value is less than a threshold. A filler value for the missing RSSI value $rssi_M^i$ may then be determined as $rssi_M^i = sum(rssi_M^j)/|N|$ for $j \in N$. These calculations may be performed iteratively until the calculated RSSI values converge. Note that the value of the threshold distance here may be set to any desired value. In some cases, the threshold may be set so that the local neighborhood used when averaging RSSI values is defined as a three meter-by-three meter area, although this is for illustration only. Also note that other suitable techniques may be used for averaging or otherwise using known RSSI values in order to fill in missing or incomplete RSSI values.

The filled fingerprint data 310 (and optionally the original fingerprint data 308 or the preprocessed version thereof) can be used to train a machine learning (ML)-based RSSI generator 312. As a result, at least the filled fingerprint data 310 may be said to represent a first training dataset. The RSSI generator 312 represents a deep learning model or other machine learning model that is trained to predict RSSI values for the wireless transmitters 204-210 associated with the specified area 202 at different location coordinates within the specified area 202. For example, the RSSI generator 312 can be trained using the RSSI fingerprints contained in the filled fingerprint data 310 and optionally the original fingerprint data 308 or the preprocessed version thereof, which allows the RSSI generator 312 to be trained to estimate what RSSI fingerprints would likely look like at different locations within the specified area 202. Again, the RSSI generator 312 is trained to perform the "inverse" of RSSI-based location prediction since the RSSI generator 312 is trained to estimate RSSI fingerprints at locations within the specified area 202 (rather than being trained to identify a location within the specified area 202 based on an RSSI fingerprint).

The trained RSSI generator 312 is used to create imputed/augmented fingerprint data 314, which includes RSSI fingerprints for various specified locations within the specified area 202 that are generated by the RSSI generator 312. For instance, the imputed/augmented fingerprint data 314 may include RSSI fingerprints from the original fingerprint data 308 (or the preprocessed version thereof) along with additional RSSI fingerprints generated by the RSSI generator 312. The additional RSSI fingerprints generated by the RSSI generator 312 may be produced for original RSSI fingerprints that contained missing or incomplete RSSI values in the original fingerprint data 308. The additional RSSI fingerprints generated by the RSSI generator 312 may also include RSSI fingerprints for locations that lacked RSSI values in the original fingerprint data 308. In some cases, the RSSI generator 312 may generate a large number (and possibly a very large number) of RSSI fingerprints for inclusion in the imputed/augmented fingerprint data 314.

The RSSI generator 312 may be implemented using any suitable machine learning model. For example, in some embodiments, the RSSI generator 312 may represent a deep neural network or other deep learning model, such as a multi-layer perceptron. Also, the RSSI generator 312 may be trained to perform any suitable RSSI data generation task. For instance, the RSSI generator 312 may be trained to map location coordinates within the specified area 202 into RSSI values for up to M wireless transmitters. In addition, the RSSI generator 312 may be trained in any suitable manner. One example technique for training the RSSI generator 312 is described below.

The model training subprocess 304 generally operates to use the imputed/augmented fingerprint data 314 (possibly along with other fingerprint data described above) in order to produce a trained location prediction machine learning model 316. As a result, at least the imputed/augmented fingerprint data 314 may be said to represent a second training dataset. The trained machine learning model 316 represents a machine learning model that has been trained to predict location coordinates based on received RSSI values. The location prediction machine learning model 316 is used during the location prediction/inferencing subprocess 306 in order to process RSSI input data 318 and generate predicted locations 320 based on the RSSI input data 318. For example, the RSSI input data 318 may include an RSSI fingerprint generated by an electronic device 101 based on wireless signals 212 received by the electronic device 101, and the location prediction machine learning model 316 can analyze the RSSI fingerprint and estimate a location 320 of the electronic device 101 within the specified area 202 based on the RSSI fingerprint. In some cases, the RSSI input data 318 may be preprocessed prior to analysis by the location prediction machine learning model 316, such as when multiple RSSI values associated with each wireless transmitter are identified and averaged.

The trained location prediction machine learning model 316 may be used by any suitable device(s) to perform location prediction. In some cases, for instance, the trained machine learning model 316 may be generated by one device (such as the server 106) and then used by the same device to process RSSI values measured by other devices (such as electronic devices like the electronic device 101). In other cases, the trained machine learning model 316 may be generated by one device (such as an electronic device like the electronic device 101) and then used by the same device to process RSSI values measured by the same device. In still other cases, the trained machine learning model 316 may be generated by one device (such as the server 106) and then deployed to other devices (such as electronic devices like the electronic device 101) for use by the other devices in processing RSSI values measured by those other devices. In general, this disclosure is not limited to any particular configuration of devices that generate and use the trained location prediction machine learning model 316.

In some cases, prior to deployment or use of the trained location prediction machine learning model 316, the trained machine learning model 316 can be tested for validation purposes. This may typically include providing RSSI fingerprints associated with known locations as RSSI input data 318 to the machine learning model 316, where the RSSI fingerprints used for validation were not previously used during training of the machine learning model 316. The predicted locations 320 produced by the machine learning model 316 can be compared to the known locations in order to verify whether the predicted locations 320 produced by the machine learning model 316 are accurate (at least to within some specified amount, percentage, or other accuracy measure). Assuming the predicted locations 320 produced by the machine learning model 316 are adequately accurate, the machine learning model 316 can be deployed or otherwise used during the location prediction/inferencing subprocess 306.

The machine learning model 316 may be implemented using any suitable machine learning model that can be trained to generate location predictions based on RSSI values. In some embodiments, the machine learning model 316 represents a deep neural network or other deep learning model. In particular embodiments, the machine learning model 316 represents a weighted K-nearest neighbor (WKNN) neural network or other WKNN-based machine learning model. A WKNN model can compare similarities or distances between an RSSI fingerprint being analyzed (such as one contained in the RSSI input data 318) and RSSI fingerprints that are expected to be seen at known locations (such as RSSI fingerprints contained in the imputed/augmented fingerprint data 314). Essentially, the imputed/augmented fingerprint data 314 here can act as a "known RSSI fingerprint" database, and similarities or distances between the RSSI fingerprint being analyzed and the known RSSI fingerprints can be determined. The K "nearest neighbors" can be identified, where these neighbors represent the K RSSI fingerprints that are associated with known locations and that have the smallest distances or greatest similarities to the RSSI fingerprint being analyzed. A weighted average of the location coordinates associated with the K nearest-neighbor RSSI fingerprints can be calculated and used as a predicted location 320 for the RSSI fingerprint being analyzed. WKNN can be particularly useful when the trained machine learning model 316 is deployed to mobile devices or other devices that are resource-constrained (such as in terms of processing power or memory) since WKNN has low computational overhead and is robust to missing data at inferencing time. The value of K in the WKNN algorithm may be tunable or adjustable depending on the circumstances. Note, however, that any other suitable machine learning model structure may be used here as the location prediction machine learning model 316. Example techniques for identifying distances or similarities between RSSI fingerprints are described below, and example techniques for weighting location coordinates associated with the K nearest-neighbor RSSI fingerprints in order to produce a predicted location 320 are described below.

It should be noted that the functions shown in or described with respect to FIG. 3 can be implemented in an electronic device 101, server 106, or other device(s) in any suitable manner. For example, in some embodiments, at least some of the functions shown in or described with respect to FIG. 3 can be implemented or supported using one or more software applications or other software instructions that are executed by the processor(s) 120 of the electronic device 101, server 106, and/or other device. In other embodiments, at least some of the functions shown in or described with respect to FIG. 3 can be implemented or supported using dedicated hardware components. In general, the functions shown in or described with respect to FIG. 3 can be performed using any suitable hardware or any suitable combination of hardware and software/firmware instructions. Also, the functions shown in or described with respect to FIG. 3 can be performed by a single device or by multiple devices.

Although FIG. 3 illustrates one example of a process 300 for wireless RSSI-based positioning, various changes may be made to FIG. 3. For example, any additional information may be used to help train the RSSI generator 312 or the location prediction machine learning model 316. Also, multiple instances of the RSSI generator 312 may be produced (such as for different specified areas 202), and multiple instances of the location prediction machine learning model 316 may be produced (such as for use by different end user devices or for use in different specified areas 202).

Figure 4:
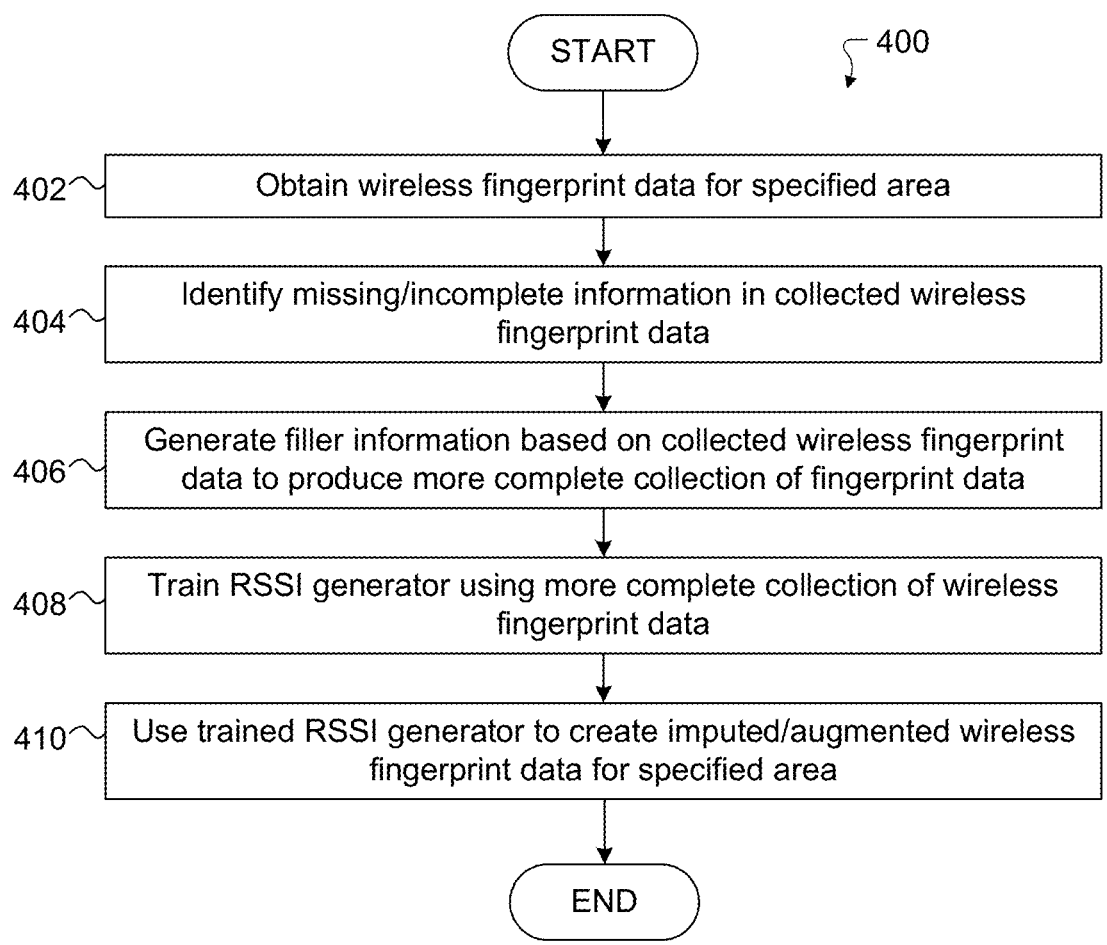
FIG. 4 illustrates an example method for performing data imputation or augmentation involving wireless RSSI-based fingerprint data in accordance with this disclosure.

FIG. 4 illustrates an example method 400 for performing data imputation or augmentation involving wireless RSSI-based fingerprint data in accordance with this disclosure. For ease of explanation, the method 400 shown in FIG. 4 is described as being performed using the server 106 in the network configuration 100 of FIG. 1, such as when the server 106 implements the data imputation/augmentation subprocess 302 of FIG. 3. However, the method 400 shown in FIG. 4 could be performed using any other suitable device (such as the electronic device 101) and in any other suitable system.

As shown in FIG. 4, wireless fingerprint data is obtained for a specified area at step 402. This may include, for example, the processor 120 of the server 106 receiving original fingerprint data 308 from one or more smart electronic devices or other source(s). The original fingerprint data 308 can include RSSI values measured or otherwise determined for various locations within the specified area 202. As a particular example, the original fingerprint data 308 may be obtained using one or more smart electronic devices used by one or more users. Each user could use his or her smart electronic device to repeatedly (i) identify his or her location in the specified area 202 (such as via an identification of a location on a displayed map of the specified area 202) and (ii) measure RSSI values for various wireless transmitters 204-210 at that location. The original fingerprint data 308 may optionally be preprocessed, such as to remove invalid or abnormal RSSI values from the original fingerprint data 308 and to arrange the original fingerprint data 308 in a desired format.

Missing or incomplete information in the collected wireless fingerprint data is identified at step 404. This may include, for example, the processor 120 of the server 106 identifying locations in the specified area 202 where one or some RSSI values were obtained for one or some of the wireless transmitters 204-210 but not for all or a specified subset of the wireless transmitters 204-210. This may also include the processor 120 of the server 106 identifying locations in the specified area 202 where no RSSI values were obtained. Filler information is generated based on the collected wireless fingerprint data in order to produce a more complete collection of fingerprint data at step 406. This may include, for example, the processor 120 of the server 106 identifying a filler RSSI value for a specific location and a specific wireless transmitter 204-210 by averaging RSSI values for the same wireless transmitter 204-210 in a local neighborhood around the specific location. This can be done repeatedly for a number of locations in the specified area 202 and for a number of wireless transmitters 204-210. This can also be performed iteratively until the calculated filler RSSI values converge. This results in the creation of filled fingerprint data 310, which includes RSSI values not contained in the original fingerprint data 308.

An RSSI generator is trained using the more complete collection of fingerprint data at step 408. This may include, for example, the processor 120 of the server 106 using at least the filled fingerprint data 310 (and optionally the original fingerprint data 308 or the preprocessed version thereof) to train a machine learning model used by the RSSI generator 312. The machine learning model is trained here to identify RSSI values that would be expected given a location within the specified area 202.

As a particular example of a training process that could be used here, the RSSI generator 312 may be trained to minimize a mean squared error or other measure of loss between actual or known RSSI fingerprints (such as those contained in the filled fingerprint data 310 or the original fingerprint data 308 or the preprocessed version thereof) and predicted RSSI fingerprints (such as those generated using the machine learning model being trained). This loss represents the error between the known and predicted RSSI fingerprints, so the loss represents the error in the design or operation of the machine learning model being trained. Weights or other parameters of the RSSI generator 312 can be adjusted to try and reduce the loss, and the RSSI generator 312 can again be used to generate predicted RSSI fingerprints that are compared to the known RSSI fingerprints in order to calculate additional losses (possibly leading to additional adjustments to the weights or other parameters of the RSSI generator 312). This can be repeated any number of times, and ideally the calculated loss improves over time so that the RSSI generator 312 produces predicted RSSI fingerprints that are more and more similar to the known RSSI fingerprints. Essentially, the RSSI generator 312 here is learning how to minimize the error between predicted RSSI values and real RSSI values. This helps the RSSI generator 312 learn physical signal attenuation effects, complex spatial dependencies, or other characteristics of the specified area 202 so that the RSSI generator 312 can generate realistic RSSI values. This training process can continue until the calculated loss is less than a specified threshold or until some other criterion or criteria are met (such as a specified number of training iterations occurring or a specified amount of training time elapsing).

Note that the use of the filled fingerprint data 310 here can provide more supervision when training the RSSI generator 312 (compared to using only the original fingerprint data 308), which allows the RSSI generator 312 to achieve improved performance. Moreover, in some embodiments, during the training and validation process for the RSSI generator 312, a masked loss can be used during back-propagation to make sure that the machine learning model of the RSSI generator 312 is learning to estimate realistic RSSI values. For instance, a masked mean squared error (MSE) or mean absolute error (MAE) loss can be defined based on the MSE or MAE loss determined using the original (real world) RSSI values. This helps to make sure that the machine learning model learns to make correct RSSI estimates based on real-world observed RSSI data.

The trained RSSI generator is used to create imputed/augmented wireless fingerprint data at step 410. This may include, for example, the processor 120 of the server 106 using the trained RSSI generator 312 to estimate the RSSI values that would be expected at various locations in the specified area 202. As a particular example, the RSSI generator 312 may be used to estimate what RSSI fingerprints might look like at certain locations in the specified area 202 where RSSI values were missing or incomplete in the original fingerprint data 308. As another particular example, the RSSI generator 312 may be used to estimate what RSSI fingerprints might look like at certain locations in the specified area 202 where no RSSI values were included in the original fingerprint data 308. Note, however, that the trained RSSI generator 312 may also be used to replace data contained in the original fingerprint data 308 with imputed or augmented data. This results in the creation of imputed/augmented fingerprint data 314.

Although FIG. 4 illustrates one example of a method 400 for performing data imputation or augmentation involving wireless RSSI-based fingerprint data, various changes may be made to FIG. 4. For example, while shown as a series of steps, various steps in FIG. 4 could overlap, occur in parallel, occur in a different order, or occur any number of times.

Figure 5:
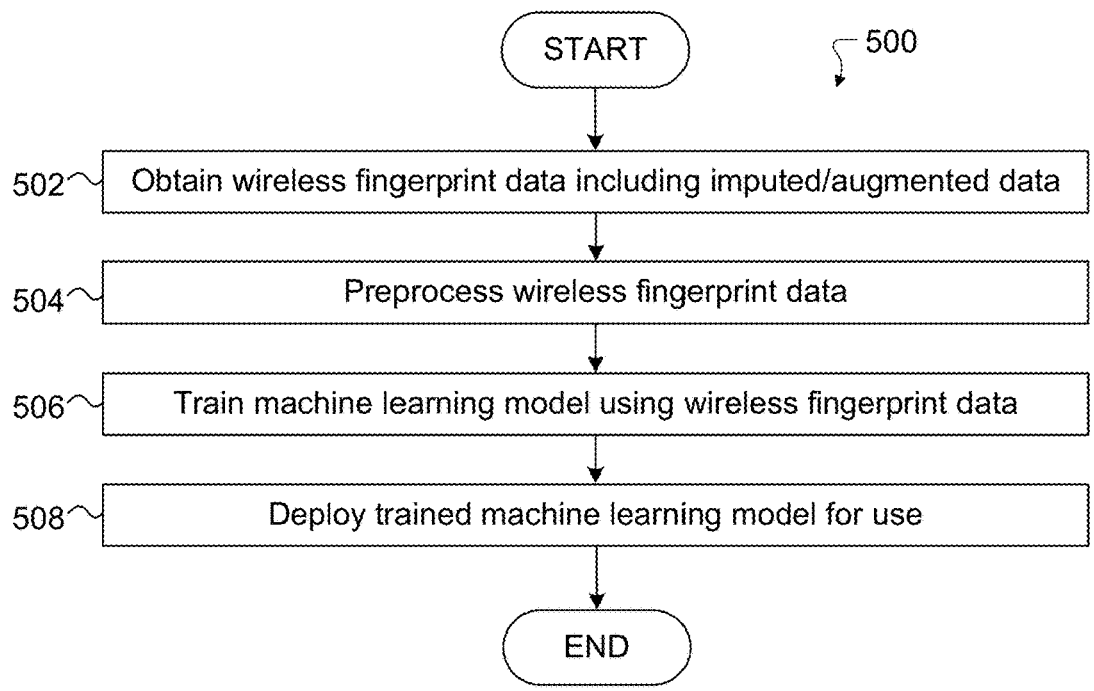
FIG. 5 illustrates an example method for training a machine learning model using imputed or augmented wireless RSSI-based fingerprint data in accordance with this disclosure.

FIG. 5 illustrates an example method 500 for training a machine learning model using imputed or augmented wireless RSSI-based fingerprint data in accordance with this disclosure. For ease of explanation, the method 500 shown in FIG. 5 is described as being performed using the server 106 in the network configuration 100 of FIG. 1, such as when the server 106 implements the model training subprocess 304 of FIG. 3. However, the method 500 shown in FIG. 5 could be performed using any other suitable device (such as the electronic device 101) and in any other suitable system.

As shown in FIG. 5, wireless fingerprint data (including imputed or augmented wireless fingerprint data) is obtained at step 502. This may include, for example, the processor 120 of the server 106 performing the method 400 described above to obtain imputed/augmented fingerprint data 314. The wireless fingerprint data may optionally be preprocessed at step 504. This may include, for example, the processor 120 of the server 106 preprocessing the imputed/augmented fingerprint data 314 in order to verify that the imputed/augmented fingerprint data 314 is in a desired format, to remove potentially abnormal RSSI values from the imputed/augmented fingerprint data 314, or otherwise prepare the imputed/augmented fingerprint data 314 for use during model training.

A location prediction machine learning model is trained using the (optionally preprocessed) wireless fingerprint data at step 506. This may include, for example, the processor 120 of the server 106 training a WKNN, neural network, or other machine learning model using the imputed/augmented fingerprint data 314 or the preprocessed version thereof. This includes using the imputed or augmented wireless fingerprint data contained in the imputed/augmented fingerprint data 314 or the preprocessed version thereof during the training. This creates a location prediction machine learning model 316 that is trained to estimate locations based on input RSSI values.

As described above, when using a WKNN model, an RSSI fingerprint being analyzed can be compared to known RSSI fingerprints so that distances or similarities between the RSSI fingerprint being analyzed and the known RSSI fingerprints can be determined. The nearest K neighbors of the RSSI fingerprint being analyzed (meaning the K closest or most similar known RSSI fingerprints) can be selected, and known locations associated with those K nearest neighbors can be combined in a weighted manner in order to produce a location estimate. Here, K represents an integer having a value greater than or equal to one. In some cases, during the training of the location prediction machine learning model 316, cross-validation of the second training dataset or other processing may be performed in order to select an appropriate value for K.

There are various types of distance or similarity metrics that can be used by the location prediction machine learning model 316 in order to identify the nearest neighbors of an RSSI fingerprint being analyzed. For example, a Euclidean distance between two vectors representing two RSSI fingerprints may be calculated using an L2-norm of the vectors. Other types of distance or similarity metrics that can be used by the location prediction machine learning model 316 may include a cosine similarity between two vectors representing two RSSI fingerprints or a correlation coefficient determined using two vectors representing two RSSI fingerprints. Note, however, that other distance or similarity metrics may be used here. In some cases, during the training of the location prediction machine learning model 316, cross-validation of the second training dataset or other processing may be performed to select the appropriate distance or similarity metric to be used.

There are also various types of weighting approaches that can be used by the location prediction machine learning model 316 to combine known locations associated with multiple nearest neighbors of an RSSI fingerprint being analyzed. These approaches can differ in how the known locations being combined are weighted. For example, a uniform weighting can be defined as follows:

$$W_i = \left(\frac{1}{K}\right)$$

where $W_i$ represents a weight applied to the known location associated with an $i^{th}$ nearest neighbor and K represents the total number of nearest neighbors selected. A reciprocal weighting can be defined as follows:

$$W_i = \text{normalize}\left(\frac{1}{dist(x_i, x_{test})^p + \alpha}\right)$$

where $x_i$ represents an RSSI fingerprint of the $i^{th}$ nearest neighbor, $x_{test}$ represents an RSSI fingerprint being analyzed, $dist(\ )$ represents a distance or similarity value (such as a Euclidean distance, cosine similarity, or correlation coefficient), and p and $\alpha$ are constants. A Gaussian kernel weighting can be defined as follows:

$$W_i = \text{normalize}\left(e^{-\frac{dist(x_i, x_{test})^2}{\sigma^2}}\right)$$

where $\sigma$ represents a standard deviation of distance or similarity values. An Epanechnikov kernel weighting can be defined as follows:

$$W_i = \text{normalize}\left(D\left(\frac{dist(x_i, x_{test})}{\lambda}\right)\right)$$

$$D(t) = \begin{cases} \frac{3}{4}(1 - t^2) & \text{if } |t| \leq 1 \\ 0 & \text{Otherwise} \end{cases}$$

where $\lambda$ is a constant. In some cases, during the training of the location prediction machine learning model 316, cross-validation of the second training dataset or other processing may be performed to select an appropriate weighting strategy and (if necessary) one or more values for one or more parameters of a selected weighting kernel. Note, however, that other weighting strategies may be used here.

The trained location prediction machine learning model is deployed for use at step 508. This may include, for example, the processor 120 of the server 106 using the trained location prediction machine learning model 316 itself in order to identify predicted locations 320 based on RSSI input data 318. This may also or alternatively include the processor 120 of the server 106 sending the trained location prediction machine learning model 316 to one or more electronic devices (such as the electronic device 101) for use.

Although FIG. 5 illustrates one example of a method 500 for training a machine learning model using imputed or augmented wireless RSSI-based fingerprint data, various changes may be made to FIG. 5. For example, while shown as a series of steps, various steps in FIG. 5 could overlap, occur in parallel, occur in a different order, or occur any number of times.

Figure 6:
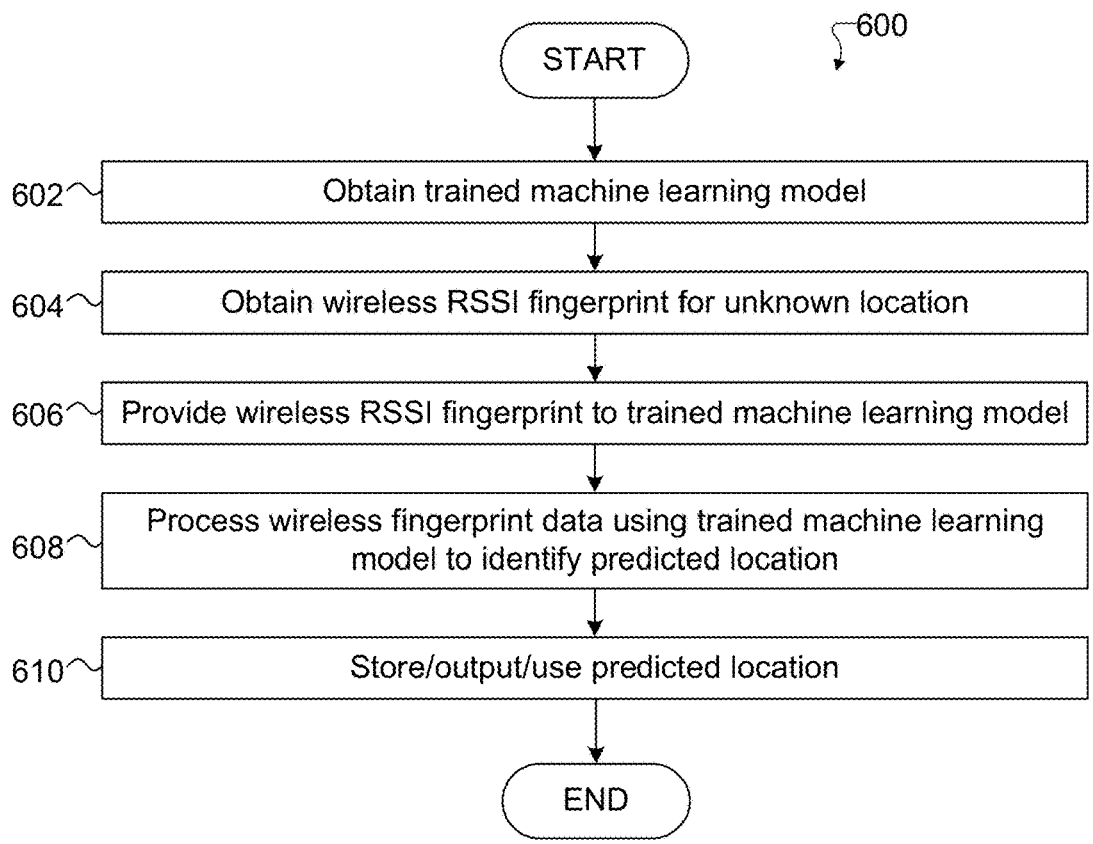
FIG. 6 illustrates an example method for wireless RSSI-based location inferencing using a trained machine learning model in accordance with this disclosure.

FIG. 6 illustrates an example method 600 for wireless RSSI-based location inferencing using a trained machine learning model in accordance with this disclosure. For ease of explanation, the method 600 shown in FIG. 6 is described as being performed using the electronic device 101 in the network configuration 100 of FIG. 1, such as when the electronic device 101 implements the location prediction/inferencing subprocess 306 of FIG. 3. However, the method 600 shown in FIG. 6 could be performed using any other suitable device (such as the server 106) and in any other suitable system.

As shown in FIG. 6, a trained location prediction machine learning model is obtained at step 602. This may include, for example, the processor 120 of the electronic device 101 obtaining the trained location prediction machine learning model 316 from the server 106 after the server 106 performs the method 500 described above. A wireless RSSI fingerprint associated with an unknown location is obtained at step 604. This may include, for example, the processor 120 of the electronic device 101 processing incoming wireless signals 212 received via the communication interface 170 and calculating RSSI values for wireless signals 212 from different wireless transmitters 204-210. This may also include the processor 120 of the electronic device 101 generating RSSI input data 318 containing an RSSI fingerprint with the calculated RSSI values.

The wireless RSSI fingerprint is provided to the trained location prediction machine learning model at step 606, and the trained location prediction machine learning model processes the wireless fingerprint data to identify a predicted location at step 608. This may include, for example, the processor 120 of the electronic device 101 providing the RSSI input data 318 to the trained location prediction machine learning model 316 and using the trained location prediction machine learning model 316 to produce a predicted location 320. The predicted location is stored, output, or used in some manner at step 610. This may include, for example, the processor 120 of the electronic device 101 displaying the predicted location 320 on a display 160 of the electronic device 101 or using the predicted location 320 to support a navigation service (such as to display a path from the predicted location 320 to a desired destination). This may also or alternatively include the processor 120 of the electronic device 101 transmitting the predicted location 320 to an external destination (such as the server 106) for use in tracking the electronic device 101, providing a navigation service, or otherwise using the predicted location 320. In general, the predicted location 320 may be used in any suitable manner by the electronic device 101 or by an external device or system.

Although FIG. 6 illustrates one example of a method 600 for wireless RSSI-based location inferencing using a trained machine learning model, various changes may be made to FIG. 6. For example, while shown as a series of steps, various steps in FIG. 6 could overlap, occur in parallel, occur in a different order, or occur any number of times.

The positioning functionality described above may be used in a large number of use cases and applications. For example, the predicted locations of electronic devices may be used in various applications that involve indoor positioning. As particular examples, this functionality can be used to track products and employees within a facility, which may allow for the identification of product/employee locations or trajectories. This functionality can be used to identify locations of customers within a facility so that the customers can identify their current locations and possibly use a navigation service to be directed towards desired destinations (such as locations of products or services desired by the customers). This functionality can be used to allow end users to locate missing electronic devices, such as by displaying predicted locations of a user and the user's missing device on a map or other visualization provided on another device. This functionality can be used by merchants to track trajectories of customers in a shopping environment or other environment (possibly with the customers' permissions) so that the merchants can analyze shopping behavior patterns and place products and advertisements at appropriate locations. This functionality can be used to supplement a Wi-Fi or other wireless RSSI fingerprint database, such as when collected data points in some areas are sparse or unavailable.

In addition to estimating locations, the functionality described above may be used in other ways. For instance, expected RSSI fingerprints generated using the RSSI generator 312 could be compared to RSSI fingerprints captured in a specified area 202. If a captured RSSI value or a captured RSSI fingerprint differs significantly from an expected RSSI value or an expected RSSI fingerprint (such by a threshold amount or percentage), this might be flagged as an anomaly. The anomaly could be indicative that an existing wireless transmitter is misconfigured, operating incorrectly, or suffering from a fault. The anomaly could also be indicative of Wi-Fi access point spoofing or some other malicious activity.

As another example, the functionality described above may be used to perform other wireless-related tasks, such as checking on the co-existence of different users and different devices. For instance, suppose two users with electronic devices walk in an indoor environment. During their movements, each of their devices can collect a series of RSSI values for Wi-Fi or other wireless signals, while any missing RSSI values in the collected series can be imputed or augmented as described above. It may then be possible to compare the collected series of RSSI values from the electronic devices in order to estimate if the users are following each other or are working together. This can be done without actually identifying the estimated positions of the users.

Note that these use cases are non-limiting examples of how the functionality described above might be used in specific applications. These use cases do not limit this disclosure to any specific application. In general, the functionality described above may be used in any suitable manner and for any suitable purpose. Also note that while RSSI values are described above as being used to support the positioning functionality, other wireless signal strength measurements may be used to support the positioning functionality.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
receiving wireless fingerprint data associated with a specified area, the wireless fingerprint data identifying (i) multiple locations within the specified area and (ii) for each location, one or more signal strength values associated with wireless signals received at the location from one or more of multiple wireless transmitters, wherein the wireless fingerprint data is missing signal strength values for one or more of the wireless transmitters at one or more specific locations within the specified area;
generating a first training dataset by adding filler signal strength values in place of at least some of the signal strength values that are missing from the wireless fingerprint data;
training a first machine learning model using the first training dataset, the first machine learning model trained to receive a specified location as input and generate predicted signal strength values as outputs; and
using the trained first machine learning model to generate additional signal strength values, at least some of the additional signal strength values to be used in place of at least a portion of the signal strength values that are missing from the wireless fingerprint data.

2. The method of claim 1, wherein:
the trained first machine learning model is used to generate a second training dataset, the second training dataset including the additional signal strength values generated using the trained first machine learning model; and
the method further comprises training a second machine learning model using the second training dataset, the second machine learning model trained to receive input signal strength values and generate a predicted location based on the input signal strength values.

3. The method of claim 2, further comprising:
deploying the trained second machine learning model to a mobile electronic device for use in predicting a location of the mobile electronic device based on wireless signals received by the mobile electronic device.

4. The method of claim 2, wherein:
the first machine learning model comprises a neural network; and
the second machine learning model comprises a weighed K-nearest neighbor model.

5. The method of claim 1, wherein training the first machine learning model comprises minimizing an error between (i) the signal strength values and the filler signal strength values contained in the first training dataset and (ii) predicted signal strength values generated by the first machine learning model during the training.

6. The method of claim 1, wherein training the first machine learning model comprises validating performance of the first machine learning model using a masked loss that is based on at least some of the signal strength values contained in the wireless fingerprint data.

7. The method of claim 1, wherein each filler signal strength value is (i) associated with location coordinates within the specified area and (ii) determined using one or more signal strength values that are within a threshold distance of the location coordinates.

8. An apparatus comprising:
at least one processing device configured to:
receive wireless fingerprint data associated with a specified area, the wireless fingerprint data identifying (i) multiple locations within the specified area and (ii) for each location, one or more signal strength values associated with wireless signals received at the location from one or more of multiple wireless transmitters, wherein the wireless fingerprint data is missing signal strength values for one or more of the wireless transmitters at one or more specific locations within the specified area;
generate a first training dataset by adding filler signal strength values in place of at least some of the signal strength values that are missing from the wireless fingerprint data;
train a first machine learning model using the first training dataset, the first machine learning model trained to receive a specified location as input and generate predicted signal strength values as outputs; and
use the trained first machine learning model to generate additional signal strength values, at least some of the additional signal strength values to be used in place of at least a portion of the signal strength values that are missing from the wireless fingerprint data.

9. The apparatus of claim 8, wherein:
the at least one processing device is configured to use the trained first machine learning model to generate a second training dataset, the second training dataset including the additional signal strength values generated using the trained first machine learning model; and
the at least one processing device is further configured to train a second machine learning model using the second training dataset, the second machine learning model trained to receive input signal strength values and generate a predicted location based on the input signal strength values.

10. The apparatus of claim 9, wherein the at least one processing device is further configured to deploy the trained second machine learning model to a mobile electronic device for use in predicting a location of the mobile electronic device based on wireless signals received by the mobile electronic device.

11. The apparatus of claim 9, wherein:
the first machine learning model comprises a neural network; and
the second machine learning model comprises a weighed K-nearest neighbor model.

12. The apparatus of claim 8, wherein, to train the first machine learning model, the at least one processing device is configured to minimize an error between (i) the signal strength values and the filler signal strength values contained in the first training dataset and (ii) predicted signal strength values generated by the first machine learning model during the training.

13. The apparatus of claim 8, wherein, to train the first machine learning model, the at least one processing device is configured to validate performance of the first machine learning model using a masked loss that is based on at least some of the signal strength values contained in the wireless fingerprint data.

14. The apparatus of claim 8, wherein each filler signal strength value is (i) associated with location coordinates within the specified area and (ii) determined using one or more signal strength values that are within a threshold distance of the location coordinates.

15. A non-transitory computer readable medium containing instructions that when executed cause at least one processor to:
    receive wireless fingerprint data associated with a specified area, the wireless fingerprint data identifying (i) multiple locations within the specified area and (ii) for each location, one or more signal strength values associated with wireless signals received at the location from one or more of multiple wireless transmitters, wherein the wireless fingerprint data is missing signal strength values for one or more of the wireless transmitters at one or more specific locations within the specified area;
    generate a first training dataset by adding filler signal strength values in place of at least some of the signal strength values that are missing from the wireless fingerprint data;
    train a first machine learning model using the first training dataset, the first machine learning model trained to receive a specified location as input and generate predicted signal strength values as outputs; and
    use the trained first machine learning model to generate additional signal strength values, at least some of the additional signal strength values to be used in place of at least a portion of the signal strength values that are missing from the wireless fingerprint data.

16. The non-transitory computer readable medium of claim 15, wherein:
    the instructions when executed cause the at least one processor to use the trained first machine learning model to generate a second training dataset, the second training dataset including the additional signal strength values generated using the trained first machine learning model; and
    the non-transitory computer readable medium further contains instructions that when executed cause the at least one processor to train a second machine learning model using the second training dataset, the second machine learning model trained to receive input signal strength values and generate a predicted location based on the input signal strength values.

17. The non-transitory computer readable medium of claim 16, wherein the non-transitory computer readable medium further contains instructions that when executed cause the at least one processor to deploy the trained second machine learning model to a mobile electronic device for use in predicting a location of the mobile electronic device based on wireless signals received by the mobile electronic device.

18. The non-transitory computer readable medium of claim 16, wherein:
    the first machine learning model comprises a neural network; and
    the second machine learning model comprises a weighed K-nearest neighbor model.

19. The non-transitory computer readable medium of claim 15, wherein the instructions that when executed cause the at least one processor to train the first machine learning model comprise:
    instructions that when executed cause the at least one processor to minimize an error between (i) the signal strength values and the filler signal strength values contained in the first training dataset and (ii) predicted signal strength values generated by the first machine learning model during the training.

20. The non-transitory computer readable medium of claim 15, wherein the instructions that when executed cause the at least one processor to train the first machine learning model comprise:
    instructions that when executed cause the at least one processor to validate performance of the first machine learning model using a masked loss that is based on at least some of the signal strength values contained in the wireless fingerprint data.

21. A method comprising:
    obtaining, by a mobile electronic device, signal strength values associated with wireless signals received at the mobile electronic device;
    providing the obtained signal strength values as input to a trained location prediction machine learning model;
    using the trained location prediction machine learning model to generate a predicted location of the mobile electronic device; and
    presenting the predicted location of the mobile electronic device on a display of the mobile electronic device;
    wherein the trained location prediction machine learning model is trained using (i) wireless fingerprint data collected within a specified area and (ii) imputed or augmented signal strength values generated using a trained generator machine learning model.

22. The method of claim 21, wherein the trained location prediction machine learning model is trained by:
    obtaining the wireless fingerprint data collected within the specified area, the wireless fingerprint data identifying (i) multiple locations within the specified area and (ii) for each location, one or more signal strength values associated with wireless signals received at the location from one or more of multiple wireless transmitters, wherein the wireless fingerprint data is missing signal strength values for one or more of the wireless transmitters at one or more specific locations within the specified area;
    generating a first training dataset by adding filler signal strength values in place of at least some of the signal strength values that are missing from the wireless fingerprint data;
    training a generator machine learning model using the first training dataset, the generator machine learning model trained to receive a specified location as input and generate predicted signal strength values as outputs;
    using the trained generator machine learning model to generate a second training dataset, the second training dataset including the imputed or augmented signal strength values produced using the trained generator machine learning model, at least some of the imputed or augmented signal strength values used in place of at least a portion of the signal strength values that are missing from the wireless fingerprint data; and
    training a location prediction machine learning model using the second training dataset to produce the trained location prediction machine learning model.

23. The method of claim 21, wherein the trained location prediction machine learning model comprises a weighed K-nearest neighbor model, the weighed K-nearest neighbor model configured to:
    identify K wireless fingerprints from training data that are closest or most similar to a wireless fingerprint formed using the obtained signal strength values; and perform a weighted combination of known locations associated with the K wireless fingerprints in order to generate the predicted location of the mobile electronic device.

24. The method of claim 23, wherein the K wireless fingerprints are identified based on one of: Euclidean distances, cosine similarities, and correlation coefficients.

25. The method of claim 23, wherein the weighted combination is determined using one of: a uniform weighting, a reciprocal weighting, a Gaussian kernel weighting, and an Epanechnikov kernel weighting.

26. The method of claim 21, further comprising:
receiving the trained location prediction machine learning model from a server that deploys the trained location prediction machine learning model to the mobile electronic device.

* * * * *